United States Patent [19]
Feldman

[11] 3,795,372
[45] Mar. 5, 1974

[54] SAIL ROTOR CRANE
[76] Inventor: Lewis Feldman, 88 Massau Rd., Amityville, N.Y. 11758
[22] Filed: Aug. 23, 1971
[21] Appl. No.: 174,036

[52] U.S. Cl. .................................. 244/2, 244/17.11
[51] Int. Cl. ........................................... B64c 37/00
[58] Field of Search ...... 244/2, 17.11, 17.15, 17.17, 244/17.25, 17.27, 116, 140, 141

[56] References Cited
UNITED STATES PATENTS
| | | | |
|---|---|---|---|
| 2,862,680 | 12/1958 | Berger | 244/17.17 |
| 3,149,803 | 9/1964 | Petrides et al. | 244/17.17 X |
| 3,362,665 | 1/1968 | Larsen et al. | 244/138 A |
| 3,117,744 | 1/1964 | Roman | 244/138 A X |

Primary Examiner—Duane A. Reger
Assistant Examiner—Jesus D. Sotelo
Attorney, Agent, or Firm—Larson, Taylor and Hinds

[57] ABSTRACT

A highly versatile combination of a powered vehicle such as a truck and a flexible rotor aircraft having a lifting capacity for transporting objects from place to place while in flight enables the aircraft to be moved from place to place while stowed upon the truck and used when needed. The aircraft itself includes a rotatable shroud, a rotatable drum, and at least two flexible rotor blades which wrap around and extend outwardly from the drum through corresponding slots in the shroud. Tip engines located at the ends of the rotor blades drive the aircraft and, together with a clutch for selectively coupling the shroud to the drum, control stowing and unfurling of the rotor blades.

21 Claims, 10 Drawing Figures

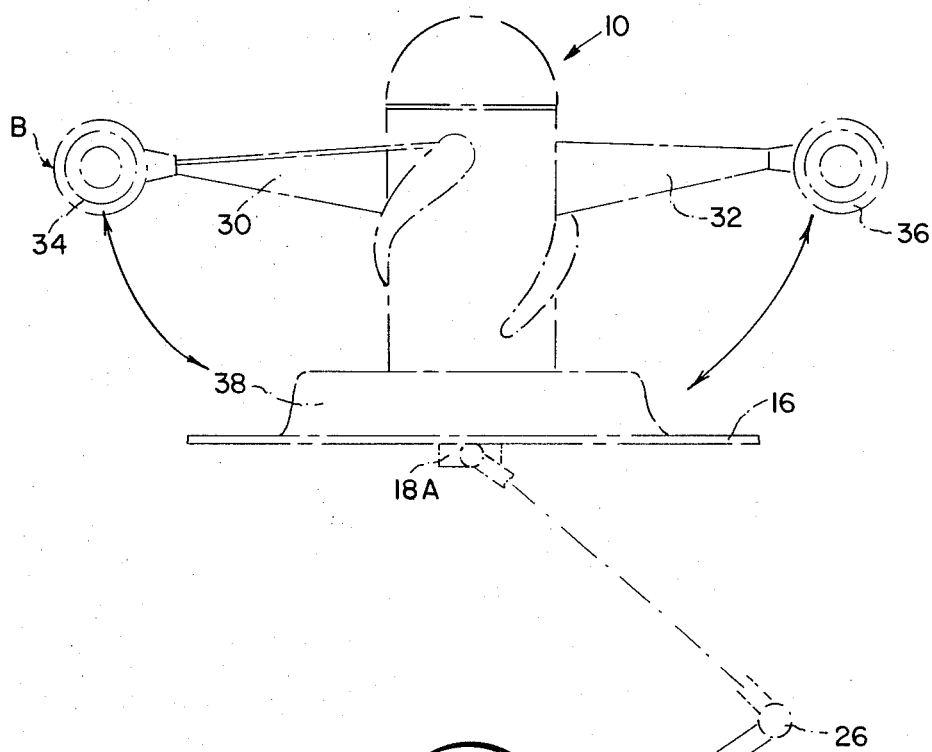
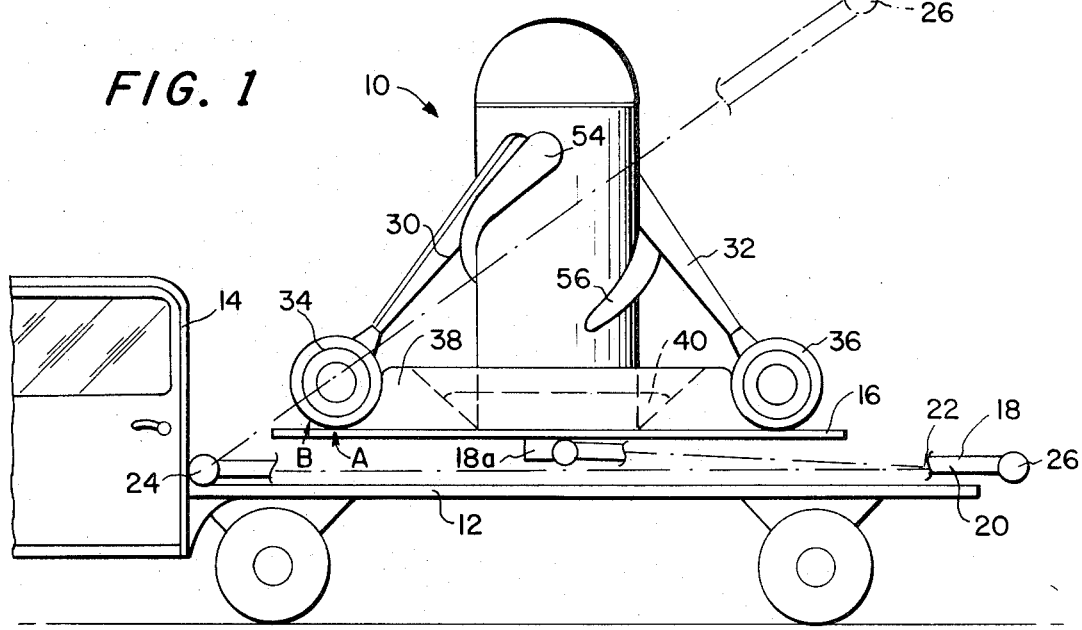
FIG. 1
INVENTOR
LEWIS FELDMAN
BY Larson, Taylor and Hinds
ATTORNEYS

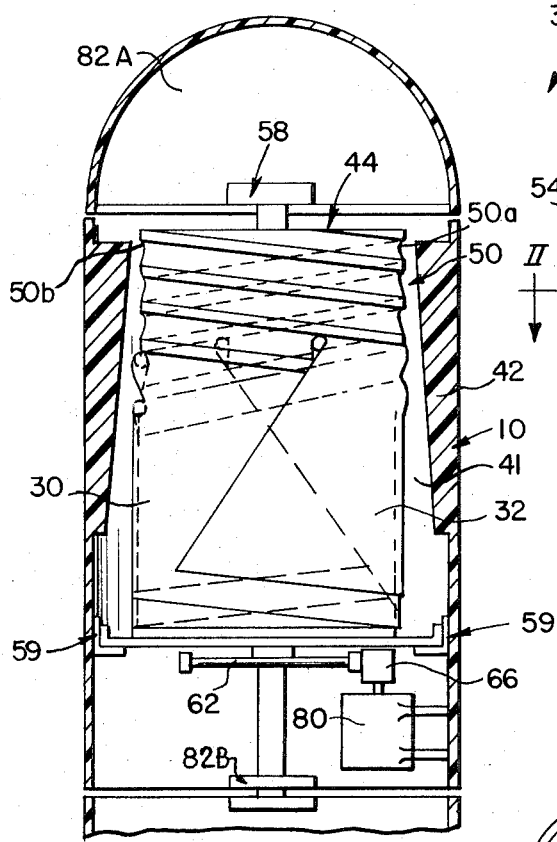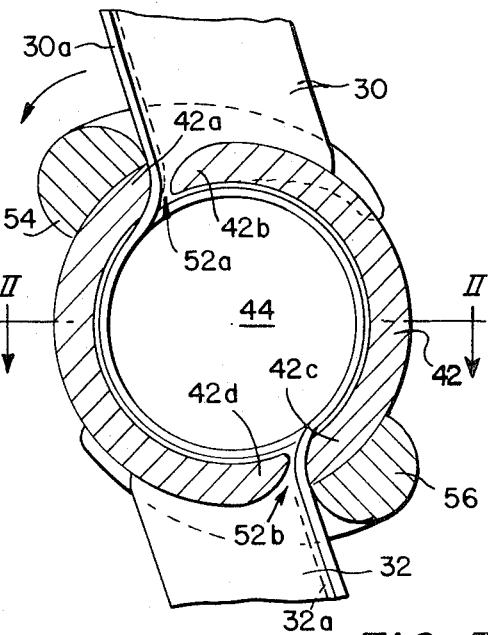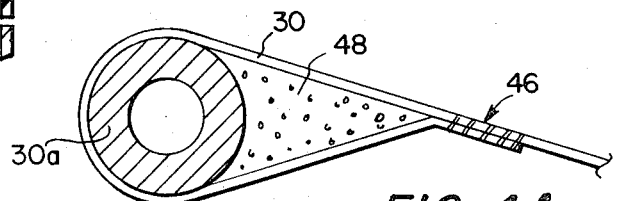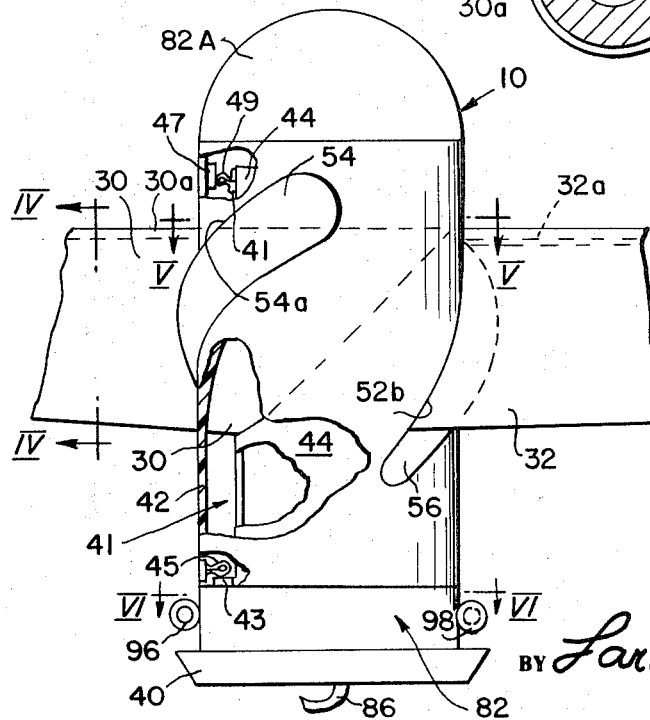

INVENTOR
LEWIS FELDMAN

BY Larson, Taylor and Hinds
ATTORNEYS 3,795,372

SAIL ROTOR CRANE

CROSS REFERENCES TO RELATED APPLICATIONS

Reference is made in this application to co-pending application, Ser. No. 789,328, now U.S. Pat. No. 3,633,850 entitled "Improvements in Flexible Sail Rotor Devices" and filed on Jan. 6, 1969, now U.S. Pat. No. 3,633,271 issued on Jan. 11, 1972 and to co-pending application, Ser. No. 174,035, entitled "Single Passenger Flexible Rotor Aircraft" and filed concurrently herewith.

FIELD OF THE INVENTION

The present invention relates to a portable flexible rotor helicopter-type crane device and to the combination of this device and a conventional powered vehicle adapted to transport the device, stow the device and enable take-off of the device from the powered vehicle.

BACKGROUND OF THE INVENTION

Conventional helicopters are transported from place to place in one of two ways, viz., by flying the helicopters under their own power or by disassembling the helicopters and using further vehicles such as trucks, trains or ships, or perhaps even other aircraft, to carry the disassembled helicopter. Surprisingly enough to the outsider, flying helicopters as a means of ferrying the helicopters to their destinations is, in general, undesirable because of the great expense attendant operation of a helicopter. For example, reference is made to the article entitled "Sometimes It Pays Not To Fly," in ROTOR AND WING, May, 1969 issue, which discusses the economies of transporting disassembled helicopters by truck as opposed to flying such helicopters to their destination.

It will be appreciated that despite the economic advantages of transporting helicopters by truck or other vehicle, this approach has serious disadvantages. In particular, the fact that conventional helicopters must be disassembled before transporting them in this manner and then reassembled at their destination is burdensome and the loading and unloading time required may be considerable. Further, such an approach requires that skilled personnel be located at both the starting point and destination to perform the disassembly and assembly operations. In addition, heavy equipment such as cranes and the like may be required in loading the helicopter on, and unloading the helicopter from, the transporting vehicle. Hnece, a need exists for a helicopter which is readily portable. In addition, such an aircraft should be capable of rapid and easy stowing aboard the transport vehicle and capable of being made ready for flight with a minimum of delay.

SUMMARY OF THE INVENTION

In accordance with the present invention a portable helicopter-type vehicle is provided which permits of ready stowing and ready conversion from a stowed condition to a condition wherein the aircraft is capable of flight.

The portable aircraft in accordance with the present invention is highly versatile and in one use could be placed aboard a freighter which must unload or load cargo at a port having inadequate loading facilities. An aircraft in accordance with the present invention, upon arriving at its destination, could be deployed used to ferry the cargo ashore and then be restowed aboard the freighter to be used at the next destination. A further example of the use of such an aircraft is in conjunction with a fighting force such as, for example, a tank corps. More specifically, the addition to a tank corps of a powered carrier for a portable aircraft such as described would enable the tanks to overcome obstacles which would normally cause considerable delays in the movement of the corps. For example, if an obstacle such as a deep stream or a wide chasm were encountered the helicopter-type aircraft of the invention could be deployed and used to ferry the tanks across this obstacle. At the end of this operation the aircraft could then ferry across its own carrier, restow itself aboard the carrier and then continue to maneuver with the tank force. In a further similar use, the portable crane aircraft of the invention could accompany an engineer force and could be deployed for use in placement of bridges or in other heavy lift operations as required.

In accordance with a presently preferred embodiment of the invention the flexible rotor airctaft includes a rotatable shroud, a rotatable drum, and at least two rotor blades constructed of a flexible material such as sail fabric secured to and extending outwardly from the drum through first and second slots defined in the shroud. First and second tip engines are located at the end of the rotor blades and means are provided for releasably stowing the engines when the engines are inoperative. A clutch arrangement, when operative, couples the shroud to the drum for rotation therewith, the clutch cooperating with the tip engines to control furling and unfurling of the flexible rotor blades.

In accordance with an important feature of the invention the leading edge portions of the two blades are each formed by fuel lines or hoses which hence serve the purpose of providing strengthening and aerodynamic shaping of the blades as well as supplying fuel or propellant to the tip engines. The drum mentioned above serves as a fuel tank and, because it rotates with the blades, eliminates the need for rotary connection between the fuel tank and the tip engines.

The portions of the rotatable shroud defining the openings through which the rotor blades extend are preferably shaped and arranged to limit the amount of bend experienced by the fuel hoses incorporated in the rotor blades so as to protect the hoses and to prevent kinking thereof. The drum itself is preferably provided with a double thread or groove arrangement in the peripheral surface thereof in which the leading end portion of the rotor blades are received to facilitate stowing of these blades.

Among the further advantages of the portable crane aircraft of the invention is that, because the rotor blades are constructed of fabric, the blades are relatively insensitive to mechanical damage from projectiles, such projectiles, on striking the fabric blades, merely puncturing them without causing further destruction thereof. Further, because the aircraft is a reaction driven machine, a minimal torque reaction system is required and there is no need for the complex reduction gears associated with conventional shaft-driven helicopters. In addition, because the aircraft is driven at the tips of the rotors, the rotor speed is independent of the propulsion system speed.

Other features and advantages of the present invention will be set forth in or apparent from the detailed description of preferred embodiments thereof described hereinbelow.

BRIEF DESCRIPTION OF THE DRAWINGS

FIG. 1 is a side elevational view of a schematic representation of a sail rotor crane aircraft-powered vehicle combination in accordance with a presently preferred embodiment of the invention, the take-off position of the aircraft, and elevator mechanism therefor, being shown in broken lines;

FIG. 2 is a section view of the aircraft vehicle of FIG. 1 taken generally along line II-II of FIG. 5 and illustrating the internal construction thereof, parts being simplified, broken away or removed for purposes of clarity;

FIG. 3 is a side elevational view similar to FIG. 2 illustrating the external construction of the aircraft vehicle, parts being broken away for illustrative purposes;

FIG. 4A is a section view to an enlarged scale taken generally along line IV — IV of FIG. 3;

FIG. 5 is a section view taken generally along line V — V of FIG. 3;

DESCRIPTION OF A PREFERRED EMBODIMENT

Figure 6:
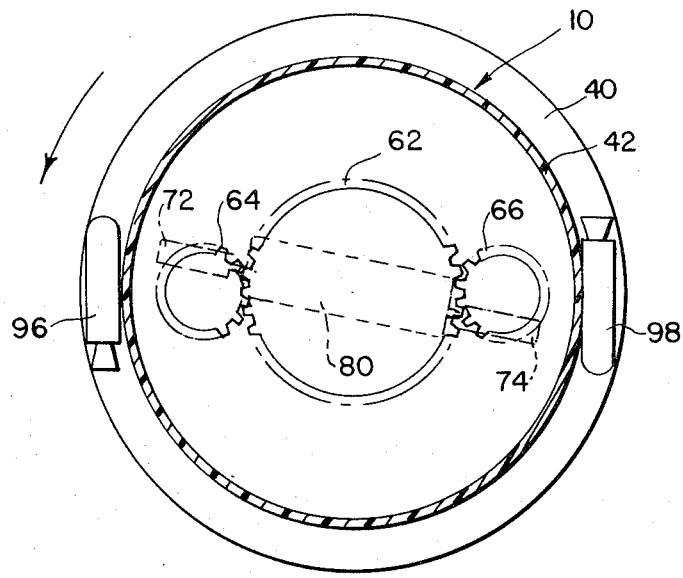
FIG. 6 is a section view, to an enlarged scale, taken along line VI — VI of FIG. 3.

Referring to FIG. 1, a portable sail rotor helicopter type crane vehicle in accordance with the present invention is generally denoted 10 and is adapted to be mounted on the bed 12 of a truck 14 or similar vehicle. The mounting or support for crane 10 includes a platform 16 on which crane 10 rests and an elevator mechanism, denoted 18 and indicated in a highly schematic manner in FIG. 1, for raising and lowering platform 16. The inoperative or stowed position of crane vehicle 10 is indicated in solid lines and the operative or take-off position of crane vehicle 10 is shown in dashed lines.

The elevator mechanism 18 may take a number of forms and in the embodiment shown in FIG. 1 includes first and second pivotable linkages 20 and 22. Linkage 20 is pivoted at one end to the bed 12 of truck 14 as indicated at joint 24 and is pivotably connected at the other end thereof to linkage 22 by means of pivotable joint 26. Linkage 22 is pivoted to a central mounting member 18A which serves in rotably supporting platform 16. A source of power (not shown), such as a hydraulic drive, controls movement of linkages 20 and 22 between a stowed position indicated in solid lines, wherein linkages 20 and 22 lie substantially flat against bed 12 as shown, and an erect position indicated in dashed or broken lines. The details of construction of the elevator mechanism 18 form no part of the present invention and further discussion thereof is considered unnecessary.

Helicopter crane 10, in the embodiment under consideration, is preferably operated by remote control in a manner similar to that in which conventional remote controlled helicopters are operated. Again, this aspect of the construction of aircraft 10 forms no part of the invention. Aircraft vehicle 10 includes first and second sail rotor blades 30 and 32 of the type described in copending U.S. Patent application, Ser. No. 789,328 filed on Jan. 6, 1969. Blades 30 and 32 are preferably constructed of sail fabric or the like which may be reinforced by suitable chordwise positioned metallic filaments if necessary (although see the discussion of FIG. 4 hereinbelow). Reference is made to that application for a more complete general description of the component parts and principals of operation of aircraft vehicles of this type. First and second tip engines 34 and 36 are located at the ends of blades 30 and 32, respectively, which engines, as explained hereinbelow, serve both in erecting blades 30 and 32 and in driving these blades.

Engines 34 and 36 can take a number of forms and are preferably either turbo-jet pulse jet engines or liquid fueled mono-or bi-propellant rocket motors. It is noted that pulse jet engines and rocket motors, because they contain no rotating parts, do not present any special problems or impose any particular limitations in use whereas, on the other hand, turbo-jet engines must include at least two rotating spools such as often provided where a fanjet is driven by a free turbine. These spools must be designed such that the total angular momentum of the jet engine, while in operation, is small so that the introduction of large gyroscopic pitching moments into the blades 30 and 32 is prevented. For the sake of cnvenience, the reaction motors 34 and 36 are referred to as jet engines hereinbelow.

Platform 16 includes a generally annular mounting block member 38 located centrally thereof, member 38 including outer portions especially shaped to receive engines 34 and 36 as shown. First and second latches or clips (not shown), the release of which is controlled by the remote operator, hold the engines 34 and 36 in place on board platform 16 in the recessed portions of block 38 provided for this purpose.

As indicated in FIG. 1 a central conical recess in the mounting block member 38 includes sloping side walls which cooperate with reciprocally shaped surfaces of a landing skirt on vehicle 10 in the form of a mating conical boss 40. It will be appreciated that these mating surfaces of block 38 and boss 40 serve in facilating of stowing of vehicle 10 and, in particular, enable the smooth return of vehicle 10 to the mounting provided therefor on platform 16. Mounting block 38 also serves in maintaining vehicle 10 erect, platform 16 itself being mounted on central support member 18A of elevator 18 so as to be always horizontal. A bearing (not shown) in central support or mount 18A permits rotation of platform 16, and hence vehicle 10 supported thereon, about a vertical axis.

Referring to FIG. 2, the internal construction of vehicle 10 is shown schematically. Vehicle 10 includes an outer hollow shroud 42 and an inner concentric hollow drum 44 (see also FIG. 3). Drum 44 serves two functions. Firstly, the sail rotor blades 30 and 32 are wound around drum 44 in the stowed portion. Secondly, drum 44 serves as a container or tank for the fuel for jet engines 34 and 36.

Figure 4B:
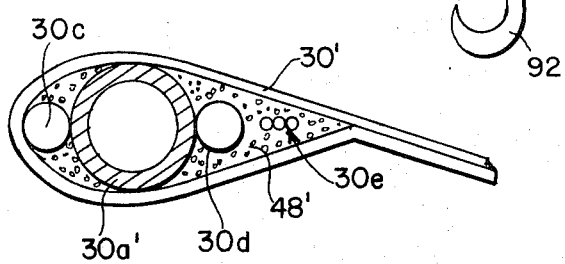
FIG. 4B is a section of view of alternate embodiment to that shown in FIG. 4A.

First and second flexible fuel lines or hoses 30a and 32a are incorporated in the leading edges of blades 30 and 32. Hoses 30a and 32a are connected to suitable fuel intake lines (not shown) on the inside of drum 44. Fuel hoses 30a and 32a serve a dual purpose in that in addition to providing connections between central fuel tank 44 and tip engines 34 and 36, hoses 30a and 32a also provide the necessary strengthening and shaping of the blades. As is described in co-pending application, Ser. No. 789,328 mentioned above, said rotor blades such as blades 30 and 32 require spanwise or radial strengthening so that the blades can withstand the tensil forces exerted thereon produced by the centrifugal action of engines 34 and 36 during flight. Further, the aerodynamic performance of such blades is improved where the leading edge of the blades is suitably blunted and shaped as shown in FIGS. 4A and 4B. Considering blade 30 as exemplary and referring particularly to FIG. 4A, to provide the required shaping hose 30a is located near the leading edge of the sail fabric 30 and the fabric is folded under therearound and sewn or otherwise secured to an inboard portion of the blade as indicated at 46. The space formed between the upper and lower portions of blade 30 and not filled by hose 30a may be filled with a suitable material indicated at 48 such as moulded rubber or soft plastic to form a suitable afterbody. Reference is also made to co-pending application, Ser. No. 174,035 entitled Single Passenger Flexible Rotor Aircraft, filed concurrently herewith, for a description of an embodiment wherein the hose itself is strengthened by longitudinal metallic filaments. The construction of blade 30' shown in FIG. 4B includes a fuel hose 30a' as well as a pair of cables 30c and 30d which add strength. Both the hose 30a' and the cables 30c and 30d carry the tensile load. In addition, the space between the upper and lower portion of the blade 30', which is, as described above, filled with a suitable material 48', also includes electrical conductors 30e for carrying current between the root and tip of blade 30'. For bi-propellant rocket two hoses can, of course, be included in the leading edge of the blade.

Referring again to FIG. 2, the upper portion of drum 44 includes a double pitch thread 50 formed therein which is shaped to match the shape of the faired leading edges, including hoses 30a and 30b, of the blades 30 and 32. The individual threads of double pitch thread 50 are denoted 50a and 50b and respectively accommodate the leading edges of blades 30 and 32 therein for stowing the blades. It will be appreciated that if more than two blades are utilized the number of independent threads formed in drum 44 would be correspondingly increased. This threading of drum 44 provides easy stowing of the blades 30 and 32 and prevents kinking and twisting of the blades. It will be appreciated that the threading arrangement ensures that the leading edge portions of each of the sail rotor blades 30, 32 in which the hoses 30a, 32a are incorporated are never wrapped over another portion of the blade.

Referring particularly to FIGS. 5 and 3, the shroud 42 includes first and second slots 52a and 52b through which blades 30 and 32 extend. Slots 52a and 52b are inclined to the horizontal as shown in FIG. 3 so as to accommodate blades 30 and 32 which, although substantially horizontal at the tip ends thereof during flight, form a substantial angle with the horizontal at the inboard ends thereof. In the FIG. 3, the blades 30 and 32 are shown in the almost completely deployed condition as is indicated by the proximity of the ends of the blades 30 and 32 to the ends of the slots 52a and 52b in shroud 42, the blades 30 and 32 being tapered along their extent. As shown in FIG. 5, shroud 42 is provided with fairing arrangement for protecting the hoses 30a and 30b from damage. It will be understood that during ordinary modes of operation, the tip engines 34 and 36 will accelerate and decelerate and hence the sail rotor blades 30 and 32 will tend to wrap around the shroud 42 in the forward or aft direction. It should be noted that blades 30 and 32 rotate in a counter-clockwise direction as viewed in FIG. 5 as is indicated by the arrow. Considering blade 30 as exemplary, an external fairing member 54 secured to shroud 42 prevents hose 30a from kinking during forward oscillations of blade 30. The fairing member 42 and "forward" portion 42a of shroud 42 forming slot 52a are shaped as shown in FIG. 5 so that kinking of the blade 30, and more particularly of hose 30a which extends therealong, such as would likely be caused with the relatively thin, sharp edge of shroud 42 in contact with blade 30, is prevented. The problem of kinking of hose 30a is even more acute when blade 30 accelerates (owing to among other reasons, the increased force with which the hose 30a is bent around the area of shroud 42 forming slot 52a), but because the fairing arrangement described prevents hose 30a from assuming a radius of curvature less than the minimum radius for which hose 30a is designed kinking of hose 30a is prevented even under these circumstances. Similarly, the "aft" portion 42b of shroud 42 forming slot 52a is faired to correspondingly limit the radius of curvature of hose 30a during aft oscillations. It will be appreciated that fairing member 56 and faired surfaces 42c and 42d forming slot 52b serve the same purpose. The fairings described above are necessary in the regions which contact the fuel carrying hoses 30a and 30b, that is, adjacent the region of the drum wherein the double pitched threading is provided. Aft of the leading edge, the blades 30 and 32 are constructed of sail fabric or reinforced sail fabric and thus the restrictions on the minimum radius of bend are much less. For this reason, fairing members 54, 56 and the faired shroud wall 42 are tapered down to very small fairings at the point where the trailing edge of the root chord is located. Because of this tapering the space between outer surface of drum 44 and the inner surface of shroud 42, occupied by the fairings in region adjacent the upper threaded portion of the drum 44, denoted 41 in FIG. 3, is not filled in the region adjacent the lower edge of the drum 44. Because of the angle between the root of each of the blades 30 and 32 and the drum 44 (indicated by dashed lines in FIG. 3) and because of the shallow pitch angle of the threads 50 the lower portion of the blades 30, 32 are first folded or doubled back to enable the blades to be wrapped evenly around the cylindrical drum 44. The region 41 between the drum 44 and shroud 42 is used to accommodate the excess material at the trailing edge of the sail rotor blades 30 and 32 produced by this folding of the blades during the first wrapping of the blades on drum 42.

Referring again to FIG. 2 and also to FIG. 6, a drive arrangement, denoted 60, is shown which is used in deploying or furling of blades 30 and 32. Shroud 42 is rotatably mounted with respect to drum 44 by upper central bearing assembly 58 and lower annular or ring bearing assembly 59. As mentioned hereinabove, blades 30 and 32 will be wrapped onto drum 44 when shroud 42 is rotated with respect to drum 44 when shroud 42 is rotated with respect to drum 44 in the direction opposite to the arrow shown in FIG. 5. Correspondingly, the blades 30 and 32 will be deployed or unfurled from drum 44 when shroud 42 rotates in the direction of the arrow with respect to drum 44. Further, when the drum 44 and shroud 42 are locked together the blades 30 and 32 are prevented from being either deployed or retracted. The drive arrangement 60 controls relative rotation between the shroud 42 and the drum 44.

Drive arrangement 60 includes a worm gear 62 which is secured to the drum 44 concentric with the longitudinal axis thereof. Worm gear 62 engages worm wheel 66 driven by motor 80 secured to the shroud 42. When motor 80 is energized, the drum 44 is caused to rotate with respect to the shroud 42. By driving the motor 80 in the forward or reverse directions, the drum 44 can be made to rotate in either direction with respect to the shroud 42, causing either deployment or furling of the blades 30, 32. The worm gear pair 62, 66 is self-locking, hence drum 44 is locked to the shroud 42 whenever the motor 80 is not energized. This locking of the drum to the shroud has the effect of locking the corresponding portion of the blade in the deployed condition. It will be appreciated that other forms of drive systems may be utilized for performing the stated function.

Figure 7:
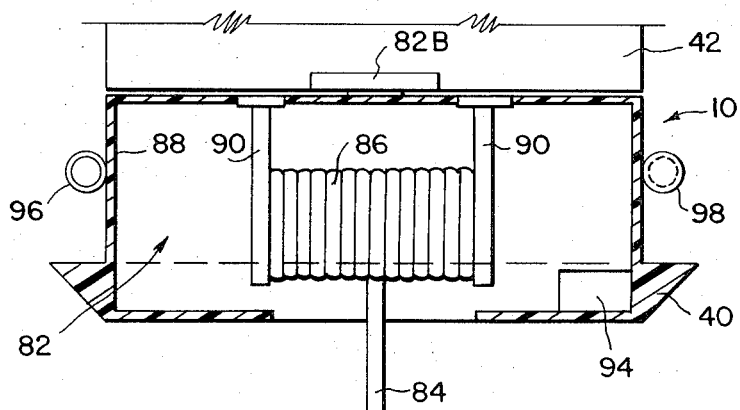
FIG. 7 is a side elevational view, partially in section, of a detail of the payload compartment shown in FIG. 3.

Referring to FIG. 7, a payload section 82, suspended beneath shroud 42, is shown. Payload section 82 is part of a "payload carrier" described hereinbelow and for reasons which will become more clear from the description of the vehicle control system, is also referred to as the guidance and control section. A cable 84 is shown pendant from a winch 86 suspended from an upper wall of payload housing body 88 by support rods 90. A lifting device at the end of cable 84 is represented by a hook 92. It is noted that in many applications it is necessary or desirable that a payload section be provided which does not rotate with rotation of sail rotor blades 30 and 32. For example, such an arrangement may be required when it is desired to provide a non-rotating base for instrumentation such as indicated at 94 or to reduce twisting of cable 84 to an amount below that furnished by the cable swivel (not shown) and the associated tendency of a load suspended from hook 92 to turn. In addition, manually operated systems also require a substantially non-rotating base of operation. Although this is not indicated in the drawings, it is noted that instrumentation unit 94 controls operation of winch 86 as well as tip engines 34 and 36, among other functions.

Payload section 82 of FIG. 7 is non-rotating, section 82 being mounted for rotation with respect to shroud 42 by central bearing assembly 82B. However, it is noted that because of the inevitable friction in bearing 82B, section 82 will tend to rotate with shroud 42. To prevent this first and second reaction motors 96 and 98 are secured to payload housing 88. Motors 96 and 98 are mounted with respect to payload housing 88 such that the line of action of the thrust of each is perpendicular to a radial line drawn from the axis of symmetry of shroud 42. Further, as can best be seen in FIG. 6, the reaction motors 96 and 98 are oriented so that the torque produced by the thrusts thereof is opposite to the direction of rotation of shroud 42 during operation of vehicle 10 so as to counteract the rotation forces.

It is noted that in systems requiring close control of the azimuth of the payload section 82 a further pair of reaction motors (not shown) can be used to produce a thrust opposite to that produced by reaction motors 96 and 98. With such an arrangement the two pairs of reaction motors could be used jointly to precisely control the azimuthal orientation of payload section 82 as required (see FIGS. 8 and 9 discussed hereinbelow).

It is noted that the root blade angle and tip blade angle of blades 30 and 32 are preferably maintained at optimum settings, although these optimum settings depend on the condition of operation of vehicle 10. For example, during a mission, a substantial change in vehicle gross weight takes place during the lifting or setting down of a load. In a conventional helicopter the corresponding change in thrust requirement would be provided by changing the collective pitch setting at constant rotor speed. With an outboard type system such as that of the invention, collective pitch control is available automatically without any additional mechanization. In conventional helicopters, the rotor is held to narrow limits of speed, that is, the rotor is governed to nearly constant speed because of the constant speed nature of the propulsion system. In tip driven configurations, the propulsion system speed is completely uncoupled from the rotor speed and therefore no performance loss is engendered by letting the rotor speed vary within tolerable limits.

Further, in conventional helicopters, it is common to find the throttle control linked directly to the collective pitch control so that increasing the throttle setting, that is, calling for more power, automatically increases the rotor collective pitch setting. This arrangement is provided in order to preclude short term over-speeding and also to anticipate the inevitable increase in pitch that the commanded increase in power will eventually produce. The rotor thrust control in these tip driven helicopters can be used to command any optimum combination of the jet engine thrust and rotor rpm that properly suits the vehicle, and the rotor overspeed protector can also command an optimum combination of these two parameters so as to safely limit the rotor rpm with a minimum of interference with the functions of the machine as a whole.

For the sake of simplicity, the rotor thrust control system discussed hereinbelow controls the rotor thrust through the control of the tip engine thrust and thence through the change in toro rpm. This simple control is adequate for all systems in which the vertical channel (rotor thrust control) does not require a high rate of response. In the event that higher rates of response are necessary, it will be desirable to command a simultaneous change in both tip engine thrust and collective pitch change. This will give the control a similarity to the conventional control just described above. But the distinction remains that this machine does not have to maintain constant or nearly constant speed.

In an entirely similar way, the rotor overspeed control is based on a pure use of rotor collective pitch. However, more flexibility is afforded to the designer if the governor is designed into the system so as to use the available parameters in an optimum fashion. For example, an appropriate combination of collective pitch and tip engine thrust can be utilized.

The control system for vehicle 10 is made up of the following control "channels:" (1) pitch, for controlling pitch attitude and forward velocity and position; (2) roll, for controlling lateral attitude, speed and position; (3) yaw for azimuthal control of the vehicle 10; and (4) a thrust control for controlling rate-of-climb and altitude. In addition, a rotor overspeed control device is provided for limiting the rotor rpm to safe values.

Considering altitude control first, the altitude of vehicle 10 is controlled through control of the thrust of tip jet engines 34 and 36. In order to increase altitude, the settings of the throttles (not shown) of jet engines 34 and 36 are advanced to provide increased jet engine thrust. This increased thrust increases the rpm of blades 30 and 32 which in turn provides an increase in rotor lift. The increased rotor lift, of course, causes the vehicle 10 to climb. To arrest the climb or cause the vehicle 10 to descend, the aforementioned throttle is reduced to provide the opposite effect. Methods of control for jet engine throttles are well developed and can be effected by an operator remote from vehicle 10. Any suitable throttle control method can be utilized and further description thereof is deemed unnecessary. In order to protect the blades 30 and 32 against overspeeds, a governor (not shown) responsive to rotor r.p.m. is used to limit the throttle settings.

Considering pitch (or roll) control, it is noted that in the type of vehicle under discussion, the pitch control and the roll control are exactly the same except for their identification. That is, because of the shape of the vehicle 10 and the type of drive utilized, the choice of designating one portion of the vehicle 10 as the "front" or the "side" is an arbitrary one. Therefore, it is necessary only to explain the operation of one of these channels in that the same principles apply for both. Longitudinal control of vehicle 10 is effected by the forward tilt of the plane of the blades 30 and 32. This tilt is in turn controlled by cyclic pitch introduced roughly along the lateral axis of the vehicle 10. In mbodiment shown, the cyclic pitch is introduced by means of what may be termed an "electrical swash plate," described hereinbelow, for controlling the pitch angle at the tip of the blades 30 and 32.

Referring to FIG. 3, a blade tip actuator 35 for a tip fin 37 is indicated schematically. The tip fin actuator 35 controls the incidence setting of the tip fin 37 with respect to the tip body formed by engine 36 in accordance with a signal transmitted from section 82 through a suitable conductor 39 incorporated in blade 32. The incidence of the tip fin 37 in turn controls the pitch attitude of the tip body 36 in much the same way as the stabilizer or elevator setting of an airplane controls the angle of attack of the airplane. Since, in the embodiment under consideration, the tip chord of the blade 32 is fixed to the tip body as shown, pitching the tip body 36 changes the blade tip angle setting. Aternatively, it is noted that a tip chord actuator, corresponding to that disclosed in my co-pending application, Ser. No. 789,328 mentioned above, could be used to control the incidence of the tip chord with respect to the tip body 36, and hence provide the needed pitch variation for the blades 30 and 32.

Figure 8:
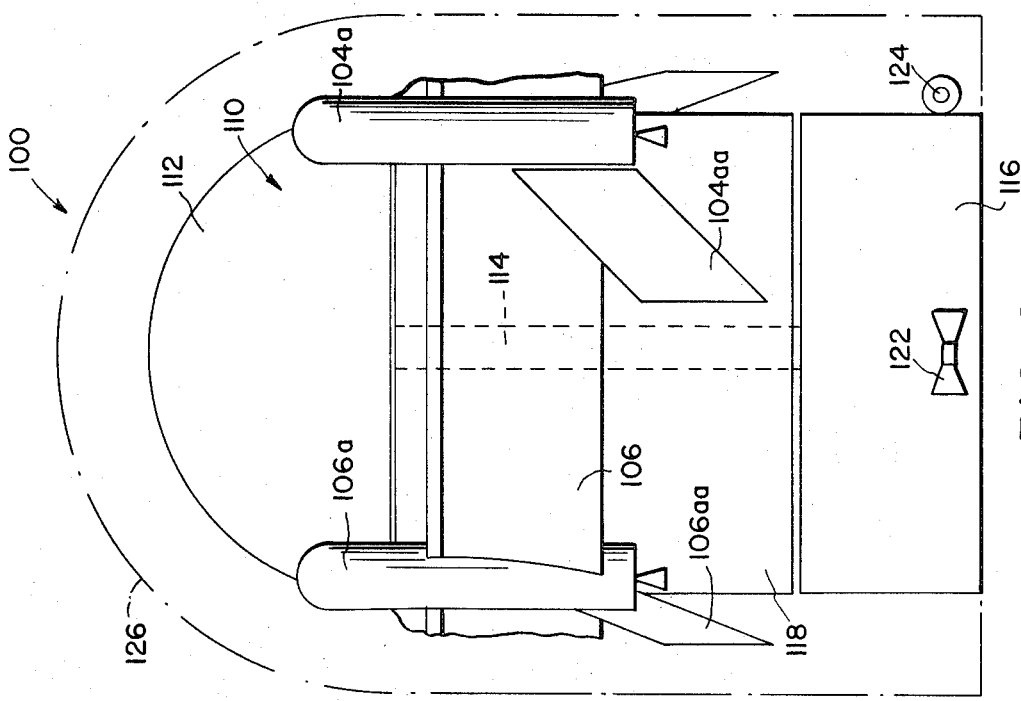
FIG. 8 is a side elevational view of a sail rotor craft in accordance with a further, presently preferred embodiment of the invention.
Figure 9:
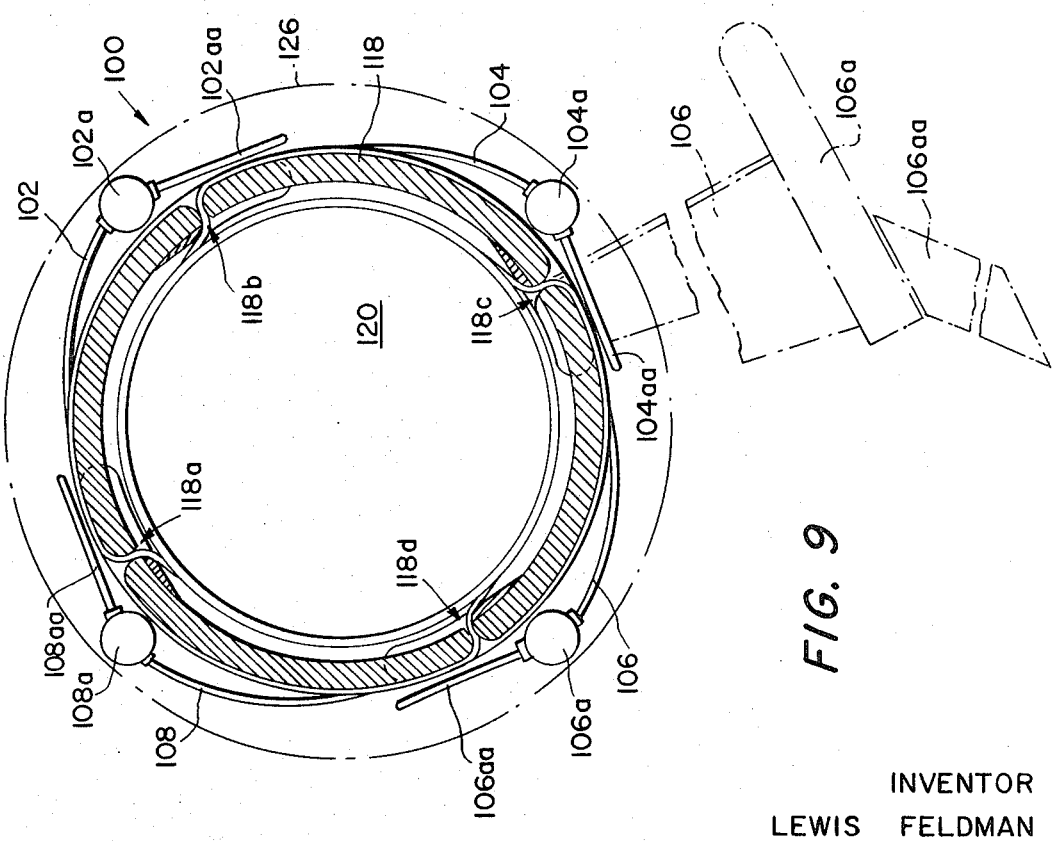
FIG. 9 is a transverse section view of the embodiment of FIG. 8, one of the blades being shown in the deployed state thereof in dashed lines.

As is desicussed in more detail with reference to FIGS. 8 and 9 payload section 82 is part of a payload carrier which includes an upper domed section 82A which is connected to section 82 through a cetnral shaft (not shown) integral with these sections. The guidance and control systems are assumed to be located in section 82 and the entire payload carrier is assumed to be stabliized in yaw, that is, some reference mark thereon is controlled to point in a given direction. However, as noted hereinabove, it is by no means necessary for automatically controlled systems that a yaw stabliized arrangement be utilized. From the above discussion, the following relationships can be seen to exist:

1. The control carrier 82A is stationary (does not rotate);
2. The shroud 42 always rotates with the deployed portion of the blades 30 and 32 and hence with the blade tips; and
3. The drum 44 rotates with the undeployed portion of the blades 30 and 32 and with the blade roots.

The electrical conductors, corresponding to conductor 30e, which carry the control voltages to actuators, such as actuator 35, at the blade tips run from the tip to the root of the blades 30 and 32. Such conductors can be attached to the structure forming the flexible leading edge of the blades 30 and 32 or built right into the leading edges of blades 30 and 32 or into the hoses 30a and 32a.

To connect the control system or controller, which determines the magnitude of the inputs required and is located in the non-rotating control section 82, to the conductors located in rotor blades 30 and 32, an "electrical swash plate" assembly corresponding to that disclosed in the aforementioned co-pending application, Ser. No. 789,328, can be used. Such an assembly produces the proper cyclical variation in the control voltage to be transmitted to the rotating blades 30 and 32. Referring to FIG. 3, the control voltage is supplied to an annular potentiometer ring 43 secured to and rotatable with guidance and control section 82. the electromechanical connection between the carrier section 82A and the shroud 42 is, as indicated in FIG. 3, effected by the potentiometer ring 43 and brushes 45 (one of which is shown in FIG. 3) secured to shroud 42. In this version of the "electrical swash plate, " the properly phased control voltage appears at a brush 45 which is physically connected to the shroud 42 and hence is in correct mechanical phase with the corresponding blade tip, which, in this instance, is assumed to be the tip of blade 30. However, becuase of the relative motion of the shroud 42 with respect to the drum 44 during deployment and retraction of blades 30 and 32, the brush 45 cannot be directly connected with the blade root which is, of course, attached to the drum 44. Because of this, the connection between the brush 45 and the blade 30, is made through an electromechanical connection between the shroud 42 and the drum 44. As shwon in FIG. 3 this connection can be a conventional slip ring connection formed by an annular ring 47 secured to shroud 42 and a suitable brush assembly 49 affixed to drum 44. Alternatively, this connection can be made by means of a slack wire (not shown) connected at opposite ends to shroud 42 and drum 44 (or, more particularly, to the brush which is attached to the shroud and to the conductor at the blade root which is connected to the drum). Such a wire would be wound about drum 44 an amount sufficient to permit the required number of turns to shroud 42 with respect to the drum 44 during deployment of blades 30 and 32, to hence prevent breaking or severe tensioning thereof. It should be pointed out that the arrangement of the elctromechanical connections between the guidance and control section 82 and shroud 42, and between shroud 42 and 44 shown in FIG. 3 could, of course, be varied and it will be understood that the arrangement of FIG. 3 is merely designed to illustrate two possible exemplary connections that might be used.

Another form of "electrical swash plate" which could be utilized involves the use of a conventional resolver as the electro-mechanical connection between the shroud 42 and the guidance and control section 82. With the shaft of the resolver mounted for rotation with the shroud 42 and the resolver case fixed to the guidance and control section 82, this device would provide a properly phased sinusoidal output. In such an embodiment, the output of the fixed portion of the resolver located in the control section 82 would be the required control voltage and a slip ring connection similar to those discussed above could be used to connect this voltage to the appropriate blade root.

Referring to FIGS. 8 and 9, a presently preferred embodiment of the sail rotor craft or vehicle of the invention is shown. The vehicle, which is generally denoted 100, includes four blades 102, 104, 106 and 108 and a central unit 110 composed of three separate sections. An upper section 112 of body 110 forms a payload compartment and is connected through a central, integral shaft 114 (shown in dashed lines in FIG. 8) to a lower guidance and control compartment 116. The unit 110 formed by payload compartment 112, connecting shaft 114 and guidance and control compartment 116 is sometimes referred to as the payload carrier.

A shroud 118 which surrounds and is located centrally of payload carrier unit 110 comprises a cylindrical member having four slots or slits 118a, 118b, 118c and 118d located in the periphery thereof through which blades 102, 104, 106 and 108 respectively extend. A drum 120 (see FIG. 9) is located concentric with, and within, the shroud 118 and as discussed hereinabove serves both as the surface around which the blades are wrapped for stowage and as a propellant tank. The payload carrier 110, the shroud 118 and the drum 120 are bearinged with respect to one another so that each is free to rotate with respect to the central axis of vehicle 100. A clutch (not shown), which can be similar to that described above, controls the relative rotation of shroud 118 with respect to drum 120. The shroud 118 and drum 120 rotate with the blades during normal operation and it is only during deployment (and perhaps during retraction or furling of the blades) that the clutch permits rotation of shroud 118 with respect to drum 120.

A four pitched thread (not shown) located on drum 110 receives the four separate leading edges of the four blades 102, 104, 106 and 108 to provide stowing thereof. The blades are stowed by causing them to wrap around drum 120 through the expedient of rotating the shroud 118 with respect to the drum 110 in the opposite direction to that which causes deployment of the blades and to that in which the blades rotate during flight. During rotation of the rotor assembly, the payload carrier 110 is stabilized in azimuth by first and second pairs of directional control rocket motors 122 and 124 which, under the control of signals from guidance and control compartment 116, cause controlled rotation of the unit 110 so that the desired heading is maintained. The two rockets forming each of the rocket pairs 122 and 124 cause rotation of unit 110 in opposite directions so that, through energization of selected ones of the two pairs, a predetermined attitude can be achieved and sustained.

Referring particularly to FIG. 9, a four tip bodies 102a, 104a, 106a and 108a are shown in their stowed positions wherein they are latched to carrier unit 110. As shown, a portion of each of the associated rotor blades 102, 104, 106 and 108 is deliberately left "unstowed" so that, for exemplary blades of about 80 feet in length, about 15 feet of each blade is left outside, that is, extends outwardly beyond the shroud 118. In the embodiment under consideration the blades are eighty feet in radius, have 110 inch root chords, 48 inch tip chords and are fabricated of "Dacron" sailcloth. By leaving a portion of the blades "unstowed," the first step in the deployment of the blades described below can be unpowered, the "unstowed" length being sized such that the tip body can deploy and pitch down into the position shown in broken lines against the torsional resistance on the blade and the tensile member or members (not shown) incorporated therein. By wrapping the blades 102, 104, 106 and 108 as shown, the tip bodies 102a, 104a, 106a and 108a are brought to their final positions wherein they are clipped or latched to unit 110 by suitable means (not shown). The tip bodies 102a, 104a, 106a and 108a each include control fins 102aa, 104aa, 106aa and 108aa which, as shown in FIG. 9, are positioned or oriented adjacent the outer surface of shroud 118 within the confines of a circle circumscribing the tip bodies themselves. During the launch phase, a windshield, denoted 126 and indicated in broken lines, encloses the stowed configuration as shown and remains in place until deploymemt begins. The windshield 126 may be removed by conventional techniques and because of the advanced state of the art in this area further discussion thereof is deemed unnecessary.

The slot or slits 118a to 118d are faired as described hereinabove and appropriately shaped fairing members are secured to the inner wall of shroud member 118 as shown.

Considering the operation of the sail rotor crane 10 itself, as well as the combination of crane 10 and powered vehicle 14, and referring particularly to FIGS. 1 to 7, crane 10 is transported by truck 14 in the configuration shown in solid lines in FIG. 1, with jet engines 34 and 36 clipped to platform 16 as set forth hereinabove.

In order to deploy crane 10, elevator mechanism 18 is activated and platform 16 is raised to the position shown in broken lines, blades 30 and 32 and engines 34 and 36 remaining at this time in the state shown in solid lines. Jet engines 34 and 36 are then started and the thrust produced thereby causes platform 16 to which engines 34 and 36 are latched, and hence the entire vehicle assembly, to rotate about the vertical axis of platform 16. It should be noted at this point that the lubricating oil used in turbo jet engines 34 and 36 will normally settle to the temporary "bottom" indicated at point A in FIG. 1. In flight, the oil sump will be located at point B. Therefore, because of the geometric arrangement of the rotor blade and engine assembly shown in FIG. 1 only relatively small angle exists between points A and B and, consequently, no difficulty is seen in adapting jet engines of conventional design to compensate for any lubrication problem that may exist.

Continuing on with a consideration of the operation of crane 10, once the entire assembly is rotating at a preselected number of revolutions per minute, jet engines 34 and 36 are unlatched from the "nests" or recesses formed in mounting block 38 and are allowed to assume the position shown in dashed or broken lines in FIG. 1, the centrifugal forces acting on blades 30 and 32 causing them to rise to the positions shown. The further or complete deployment of blades 30 and 32 may be begun at this time. It is noted that, although an automatic control system could be devised for regulating the centrifugal acceleration at the tip engines 34 and 36 on the one hand, and the rate of deployment of blades 30 and 32 on the other hand, a non-automatic system will be considered.

During deployment of blades 30 and 32, the thrust of engines 34 and 36 is adjusted when necessary to ensure that adequate centrifugal force is developed to prevent excessive "drooping" of the blades. The need for more thrust can be determined by a remote operator through control of instrumentation unit 94, unit 94 being connected to engines 34 and 36 by suitable wiring (not shown) incorporated in blades 30 and 32. Reference is again made to co-pending application, Ser. No. 789,328 for a description of a suitable control system. With the tips of blades 30 and 32 roughly horizontal, the deployment motor 80 is then operated so as to deploy a specified additional amount of blade, that is, so that a predetermined amount of blades 30 and 32 extends outwardly beyond the slots 52a and 52b in shroud 42. The effect of deploying an increased amount of blade will be to temporarily reduce the revolutions per minute of the blades 30 and 32 because of the law of conservation of angular momentum and because of the increased aerodynamic torque. The combination of reduced r.p.m. and increased blade radius will result in a decrease in the centrifugal force produced and, consequently, in an increase in the tendency of blades 30 and 32 to droop. Hence, at this time, the thrust produced by engines 34 and 36 will be correspondingly increased so as to re-accelerate the blades and thus re-establish the tips of blades 30 and 32 in their proper horizontal location. This process will be repeated for further increments of blade until the desired blade radius or amount of blade has been deployed.

It should be pointed out at this point that one feature of the combination of drum 44 and shroud 42 discussed above is that the blades 30 and 32 are automatically deployed together and hence a separate synchronizing mechanism for ensuring that equal amounts of blade are deployed at the same time is not required.

Continuing on with a consideration of the operation of crane vehicle 10, when the blades 30 and 32 are deployed to a radius sufficient to permit hovering of vehicle 10, the vehicle 10 can be unlatched from the berth therefor on platform 16 and permitted to fly free. It should be noted that the arrangement for latching sail rotor craft 10 to platform 16 may include a receptacle (not shown) in the center of mounting black 38 of platform 16 adapted for engagement by hook 86 to provide anchoring of craft 10. When craft 10 is flying free, control thereof can be effected by remote radio signals received by instruments 94. Craft 10 can be controlled to gain altitude so as to clear local obstacles such as trees, power lines, and the like. Further, blades 30 and 32 may be fully deployed at this time if desired.

Once deployed, craft 10 can be controlled in the same way as any remotely controlled helicopter and can be utilized to perform the various functions described hereinabove.

To restow craft 10 on truck 14, the winch cable 84 is preferably engaged in the previously mentioned receptacle in platform 16 and the platform 16 raised, if previously lowered, by elevator mechanism 18 to the elevation shown in broken lines in FIG. 1. The winch 86 can then be used to winch rotor craft 10 down into the nest provided in mounting block 18. Two operators located so as to be able to see perpendicular views of the cable 84 can readily determine whether craft 10 is descending properly into the space in mounting block 38, and, if not, can initiate appropriate control corrections. Once craft 10 has been winched down into the recess thereof in block 38, the blades 30 and 32 can be restowed by reversing the deployment operation described above. When blades 30 and 32 have been retracted to the positions shown in solid lines in FIG. 1, the thrust of engines 34 and 36 can be reduced further so that engines 34 and 36 gradually subside along the arcs indicated in the upper portion of FIG. 1 to the inoperative positions thereof in the recesses in mounting block 38. The engines 34 and 36 are then de-energized and latched to the block 38. The elevator mechanism 18 is then lowered and the entire rotor craft assembly can be lashed down and readied for travel aboard truck 14.

The sail rotor crane 100 of FIGS. 8 and 9 operates similarly to crane 10 and hence will not be considered separately apart from the comments above regarding stowing of the blades with substantial portions thereof extending beyond the shroud.

Although the invention has been described in detail with particular reference to a preferred embodiment thereof, it will be understood that variations and modifications can be effected in the invention as described hereinabove and as defined in the appended claims without departing from the scope and spirit of the invention.

I claim:

1. A flexible rotor aircraft vehicle comprising at least first and second flexible, tension stabilized rotor blades, first and second drive engines located at the outboard ends of said first and second rotor blades, a centrally located fuel tank for storing fuel used in operating said drive engines, means for mounting said tank for rotation with said rotor blades, and flexible hose located in said blades for connecting said centrally located tank to said drive engines so that fuel can be supplied from said tank to said engines, said flexible rotor blades being of sail-like construction and said vehicle further comprising a rotary drum to which said blades are secured and about which said blades are wrapped in a stowed, inoperative state, said blades being unwound from said drum in an erected, operative state.

2. An aircraft vehicle as claimed in claim 1 further comprising an outer protective shroud having slots through which said blades extend, the portions of said shroud forming said slots being faired to limit the curvature of the hose located in said blades whereby kinking of said hose and mechanical damage to said hose associated with stress concentration is reduced.

3. An aircraft vehicle as claimed in claim 2 wherein said hose is incorporated in the leading edges of said blades to shape and strengthen said blades, said vehicle further comprising fairing means secured to said shroud to limit the curvature of the hose carrying portions of said blade for forward and rearward positions of said blade, said fairing means and the forward portions of said shroud forming said slots cooperating to form a curved surface having a radius of curvature greater than the minimum radius of curvature of said hose, each said fairing means comprising a fairing member enlarged at the upper end of said slot and tapering down along the extent of the slot.

4. An aircraft vehicle as claimed in claim 2 further comprising clutch means for selectively coupling said drum to said shroud.

5. An aircraft vehicle as claimed in claim 4 wherein said rotoary drum forms said fuel tank.

6. An aircraft vehicle as claimed in claim 5 wherein said hose is incorporated in the leading edges of said blades to shape and strengthen the blades and said drum includes threading formed in the outer surface thereof for accommodating the tubing-carrying portions of said blades, the number of individual threads in said threading being equal to the number of blades and each said thread accommodating the tubing-carrying portion of one of the said blades.

7. An aircraft vehicle as claimed in claim 4 wherein said clutch means comprises a worm gear secured to said drum centrally thereof, a worm for engaging said worm gear, and motor means secured to said shroud for driving said gear means.

8. An aircraft vehicle as claimed in claim 1 further comprising a payload section, means for rotatably mounting said payload section with respect to the remainder of the vehicle, and means for controlling the azimuthal position of said payload section.

9. An aircraft vehicle as claimed in claim 8 wherein said payload section includes lifting means for lifting objects and transporting lifted objects from place to place during the flight of said vehicle and instrumentation for controlling the operation of said lifting means.

10. A flexible rotor aircraft vehicle comprising a body portion, at least one flexible, tension stabilized rotor blade, a drive engine located at the outboard end of said flexible rotor blade, a fuel container located within said body portion, and flexible tubing for supplying fuel from said fuel container within said body portion to said tip engine located at the outboard end of said rotor blade, said flexible tubing being incorporated in the leading edge of said flexible rotor blade to provide strengthening of said blade.

11. An aircraft vehicle as claimed in claim 10 wherein said rotor blade is constructed with a sheet of a woven fabric, an edge portion of which is folded underneath said tubing and secured to an inboard portion of the sheet to form a longitudinal space in which said tubing is located, said blade further comprising a further material located in said space for providing aerodynamic shaping of said space.

12. An aircraft vehicle as claimed in claim 10 wherein said vehicle includes a plurality of said flexible rotor blades and said fuel container comprises a rotatable drum, said vehicle further comprising a shroud concentric with and laterally surrounding said drum, and including apertures therein through which said blades extend, a substantial portion of said blades extending outwardly beyond said apertures in the stowed state thereof to permit unpowered partial deployment of the blades.

13. An aircraft vehicle as claimed in claim 12 wherein said drive engines include control fins, said fins being positioned closely adjacent the outer surface of said shroud in the stowed position thereof.

14. An aircraft vehicle as claimed in claim 12 further comprising a payload carrier comprising an upper compartment and a lower compartment joined by a central intermediate shaft, said drum and said shroud being concentric with and laterally spaced from said shaft.

15. An aircraft vehicle as claimed in claim 14 further comprising rocket means for stabilizing said payload carrier in azimuth.

16. In combination, a flexible rotor aircraft including lifting means for lifting and transporting objects while said aircraft is in flight and a powered vehicle for transporting said aircraft in the assembled form thereof from place to place, said vehicle including means for mounting said aircraft thereon, and said flexible rotor aircraft comprising a rotatable shroud, a rotatable drum, at least first and second rotor blades constructed of a flexible material secured to and extending outwardly from said drum through first and second slots defined in said shroud, first and second drive engines located at the ends of said rotors, means for releasably stowing said engines when said engines are inoperative and clutch means for selectively coupling said shroud to said drum for rotation therewith.

17. The combination as claimed in claim 16 wherein said vehicle further comprises means for elevating said aircraft to a position wherein said aircraft can take off from said vehicle.

18. The combination claimed in claim 17 wherein said mounting means includes a platform capable of elevation by said elevating means, means for mounting said platform for rotation relative to said elevating means and means for releasably mounting said aircraft on said platform such that platform can rotate with said vehicle upon energization of said drive engines.

19. The combination claimed in claim 18 wherein said mounting means includes an annular mounting block extending upwardly from said platform and having a generally conical recess therein, said vehicle including a correspondingly shaped conical mating boss for engaging in said conical recess.

20. An aircraft vehicle as claimed in claim 5 wherein said hose is incorporated into the leading edges of said blades so as to shape and strengthen said blades.

21. An aircraft vehicle comprising a rotary drum to which at least first and second flexible blades are secured and about which said blades are wound in the inoperative, stowed state thereof, and a shroud concentric with said drum having slots through which said blades extend, a substantial portion of said blades extending outwardly beyond said apertures in said stowed state of said blades to permit partial unpowered deployment of said blades.

* * * * *